US012785312B2

(12) United States Patent
Ruayana et al.

(10) Patent No.: US 12,785,312 B2
(45) Date of Patent: Nov. 3, 2026

(54) MODULAR ADAPTER ASSEMBLY

(71) Applicant: Lear Corporation, Southfield, MI (US)

(72) Inventors: Jun Roz Ruayana, Novi, MI (US); Vinodh Krishnan Balasubramanian, Sterling Heights, MI (US); John Montgomery, Canton, MI (US); William Bond, Livonia, MI (US); Erwin Baga-an, Cebu City (PH)

(73) Assignee: Lear Corporation, Southfield, MI (US)

( * ) Notice: Subject to any disclaimer, the term of this patent is extended or adjusted under 35 U.S.C. 154(b) by 336 days.

(21) Appl. No.: 18/584,778

(22) Filed: Feb. 22, 2024

(65) Prior Publication Data

US 2025/0273888 A1 Aug. 28, 2025

(51) Int. Cl.

| | |
|---|---|
| ***H01R 12/81*** | (2011.01) |
| ***H01R 12/61*** | (2011.01) |
| ***H01R 12/89*** | (2011.01) |
| ***H01R 13/436*** | (2006.01) |
| ***H01R 13/506*** | (2006.01) |
| ***H01R 13/514*** | (2006.01) |
| ***H01R 13/627*** | (2006.01) |
| ***H01R 13/74*** | (2006.01) |

(52) U.S. Cl.
CPC ........... *H01R 12/81* (2013.01); *H01R 12/613* (2013.01); *H01R 12/89* (2013.01); *H01R 13/4362* (2013.01); *H01R 13/506* (2013.01); *H01R 13/514* (2013.01); *H01R 13/6272* (2013.01); *H01R 13/745* (2013.01)

(58) Field of Classification Search
CPC .............................. H01R 12/81; H01R 12/613
USPC .................................................. 439/492, 499
See application file for complete search history.

(56) References Cited

U.S. PATENT DOCUMENTS 4,918,261 A 4/1990 Takahashi
5,932,846 A 8/1999 Zaguskin
(Continued)

FOREIGN PATENT DOCUMENTS

JP 2004104964 A 4/2004
KR 20090109308 A 10/2009
(Continued)

OTHER PUBLICATIONS

Co-pending U.S. Appl. No. 17/741,981, filed May 11, 2022.
Co-pending U.S. Appl. No. 17/741,950, filed May 11, 2022.

*Primary Examiner* — Phuong K Dinh
(74) *Attorney, Agent, or Firm* — Reising Ethington P.C.

(57) ABSTRACT

A modular electrical adapter assembly for connecting a plurality of flat cables and a plurality of wires may include a plurality of male connectors, female connectors, and adapter modules. The adapter modules may be releasably connected to one another. Each adapter module may include a first housing shell, a second housing shell, an interior space defined between the housing shells, a wire opening via which an associated wire extends into the interior space, a cable opening via with an associated flat cable extends into the interior space, a male connector disposed on the second housing shell outside of the interior space, and a female connector disposed on the first housing shell outside of the interior space. Adjacent adapter modules may be releasably connected to one another via engagement of the male connector of a first adapter module and the female connector of an adjacent second adapter module.

20 Claims, 9 Drawing Sheets

(56) References Cited

U.S. PATENT DOCUMENTS

| | | | | | |
|---|---|---|---|---|---|
| 6,165,009 | A * | 12/2000 | Anbo | H01R 31/02 | 439/379 |
| 6,514,100 | B2 * | 2/2003 | Maegawa | H01R 12/61 | 439/492 |
| 6,561,465 | B2 | 5/2003 | Kondo | | |
| 7,172,455 | B2 * | 2/2007 | Pabst | H01R 12/78 | 439/496 |
| 7,301,101 | B2 | 11/2007 | Suzuki | | |
| 10,960,831 | B2 | 3/2021 | Nishimura | | |
| 11,059,434 | B2 | 7/2021 | Iwahara | | |
| 2008/0153346 | A1 * | 6/2008 | Oesterhaus | H01R 12/675 | 439/499 |
| 2023/0369839 | A1 | 11/2023 | Ruayana | | |
| 2023/0369840 | A1 | 11/2023 | Racho | | |

FOREIGN PATENT DOCUMENTS

| | | | |
|---|---|---|---|
| KR | 102408509 | B1 | 6/2022 |
| WO | 2015122277 | A1 | 8/2015 |

* cited by examiner

MODULAR ADAPTER ASSEMBLY

TECHNICAL FIELD

The present disclosure generally relates to modular adapter assemblies for connecting one or more conductor members together, such as adapter assemblies that may be utilized in connection with and/or incorporated into vehicles for example.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
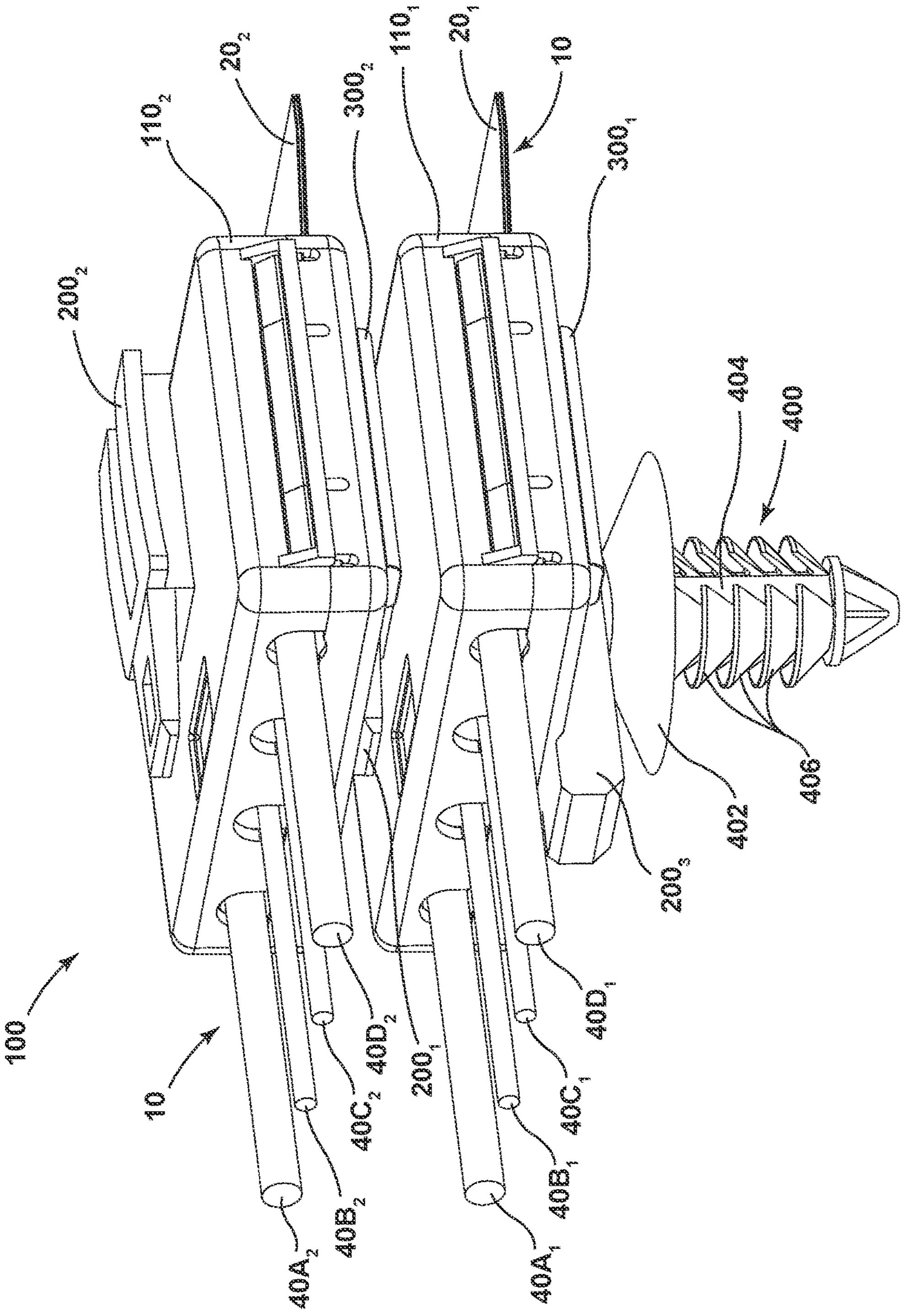
FIG. 1 is a perspective view generally illustrating an embodiment of a modular adapter assembly according to teachings of the present disclosure.

Referring to FIG. 1, a modular electrical adapter assembly 100 for connecting a plurality of conductor members 10 (e.g., a plurality of flat cables $\mathbf{20}_1$, $\mathbf{20}_2$ and a plurality of non-flat wires $\mathbf{40A}_1$-$\mathbf{40D}_1$, $\mathbf{40A}_2$-$\mathbf{40D}_2$) is depicted. The adapter assembly 100 (i) accommodates, receives, supports, and/or is connected to the conductor members 10, (ii) facilitates and/or guides connecting of the conductor members 10 to one another, (iii) enhances, reinforces and/or strengthens a connection of the conductor members 10 to one another and (iv), optionally, secures and/or attaches the conductor members 10 to one or more objects and/or structures. The adapter assembly 100 includes a plurality of adapter modules $\mathbf{110}_1$, $\mathbf{110}_2$, a plurality of male connectors $\mathbf{200}_1$-$\mathbf{200}_3$ and a plurality of female connectors $\mathbf{300}_1$, $\mathbf{300}_2$. Optionally, the adapter assembly 100 also includes a mount 400 via which the adapter assembly 100 and/or the adapter modules $\mathbf{110}_1$, $\mathbf{110}_2$ are securable to a structure (e.g., one or more portions of a vehicle, such as a vehicle floor and/or panel). The adapter modules $\mathbf{110}_1$, $\mathbf{110}_2$ and the mount 400 are disposed on top of one another (e.g., in a stacking direction) in a stacked arrangement. The adapter modules $\mathbf{110}_1$, $\mathbf{110}_2$ and the mount 400 are releasably connected to one another by the male and female connectors $\mathbf{200}_1$-$\mathbf{200}_3$, $\mathbf{300}_1$, $\mathbf{300}_2$ via adjusting and/or moving one or more of the adapter modules $\mathbf{110}_1$, $\mathbf{110}_2$ and/or the mount 400 in a connection direction, which extends perpendicular to the stacking direction.

The male connectors $\mathbf{200}_1$-$\mathbf{200}_3$ are each configured in a complimentary manner to the female connectors $\mathbf{300}_1$, $\mathbf{300}_2$ and releasably engage one or more female connectors $\mathbf{300}_1$, $\mathbf{300}_2$ (e.g., of an adjacent adapter module $\mathbf{110}_1$, $\mathbf{110}_2$ and/or mount 400). The female connectors $\mathbf{300}_1$, $\mathbf{300}_2$ are each configured in a complimentary manner to the male connectors $\mathbf{200}_1$-$\mathbf{200}_3$ and releasably engage one or more male connectors $\mathbf{200}_1$-$\mathbf{200}_3$ (e.g., of an adjacent adapter module $\mathbf{110}_1$, $\mathbf{110}_2$ and/or mount 400). Each adapter module $\mathbf{110}_1$, $\mathbf{110}_2$ includes at least one of the male connectors $\mathbf{200}_1$-$\mathbf{200}_3$ and one of the female connectors $\mathbf{300}_1$, $\mathbf{300}_2$. The mount 400 also includes at least one of the male connectors $\mathbf{200}_1$-$\mathbf{200}_3$, at least one of the female connectors $\mathbf{300}_1$, $\mathbf{300}_2$, and/or another type of connector that is releasably engageable with the male connectors $\mathbf{200}_1$-$\mathbf{200}_3$ and/or the female connectors $\mathbf{300}_1$, $\mathbf{300}_2$.

Each adapter module $\mathbf{110}_1$, $\mathbf{110}_2$ is connectable to one or more adjacent adapter modules $\mathbf{110}_1$, $\mathbf{110}_2$ and/or mounts 400 via (i) engagement of its male connector $\mathbf{200}_1$-$\mathbf{200}_3$ with the female connector $\mathbf{300}_1$, $\mathbf{300}_2$ of an adjacent adapter module $\mathbf{110}_1$, $\mathbf{110}_2$ and/or mount 400 and (ii) engagement of its female connector $\mathbf{300}_1$, $\mathbf{300}_2$ with the male connector $\mathbf{200}_1$-$\mathbf{200}_3$ of another adjacent adapter module $\mathbf{110}_1$, $\mathbf{110}_2$ and/or mount 400. For example, in FIG. 1, the first adapter module $\mathbf{110}_1$ is connected to the adjacent second adapter module $\mathbf{110}_2$ and the adjacent mount 400. The male connector $\mathbf{200}_1$ of the first adapter module $\mathbf{110}_1$ is engaged with the female connector $\mathbf{300}_2$ of the second adapter module $\mathbf{110}_2$ thereby releasably connecting the first adapter module $\mathbf{110}_1$ (e.g., the first housing shell) and the second adapter module $\mathbf{110}_2$ (e.g., the second housing shell). The female connector $\mathbf{300}_1$ of the first adapter module $\mathbf{110}_1$ is engaged with the male connector $\mathbf{200}_3$ of the mount 400 thereby releasably connecting the first adapter module $\mathbf{110}_1$ (e.g., the second housing shell) and the mount 400. In this way, the first adapter module $\mathbf{110}_1$ indirectly connects the second adapter module $\mathbf{110}_2$ and the mount 400 to one another. The male connector $\mathbf{200}_2$ of the second adapter module $\mathbf{110}_2$ is not currently engaged, but could be engaged the female connector of another undepicted adapter module and/or mount to secure the undepicted adapter module and/or mount thereto and, in this way, expand the size and/or capacity of the module adapter assembly 100.

The adapter modules $\mathbf{110}_1$, $\mathbf{110}_2$, male connectors $\mathbf{200}_1$-$\mathbf{200}_3$, female connectors $\mathbf{300}_1$, $\mathbf{300}_2$, flat cables $\mathbf{20}_1$, $\mathbf{20}_2$, and wires $\mathbf{40A}_1$-$\mathbf{40D}_1$, $\mathbf{40A}_2$-$\mathbf{40D}_2$ of the exemplary modular adapter assembly 100 depicted in FIG. 1 are substantially similar and/or identical to one another. As such, for brevity, a single adapter module 110 that includes a male connector 200 and a female connector 300, and that connects a flat cable 20 to a plurality of non-flat wires 40A-40D is depicted in FIGS. 4-10 and described below. The adapter module 110, male connector 200, female connector 300, flat cable 20, and wires 40A-40D are representative of the adapter modules $110_1$, $110_2$, male connectors $200_1$-$200_3$, female connectors $300_1$, $300_2$, flat cables $20_1$, $20_2$, and wires $40A_1$-$40D_1$, $40A_2$-$40D_2$ depicted in FIG. 1, which are therefore not described in detail for brevity. Nevertheless, in other embodiments, an adapter module $110_1$, $110_2$, male connector $200_1$-$200_3$, female connector $300_1$, $300_2$, flat cable $20_1$, $20_2$, and/or wire $40A_1$-$40D_1$, $40A_2$-$40D_2$ may be configured differently than one or more other adapter modules $110_1$, $110_2$, male connectors $200_1$-$200_3$, female connectors $300_1$, $300_2$, flat cables $20_1$, $20_2$, and/or wires $40A_1$-$40D_1$, $40A_2$-$40D_2$ of the modular adapter module 100, respectively.

Figure 2:
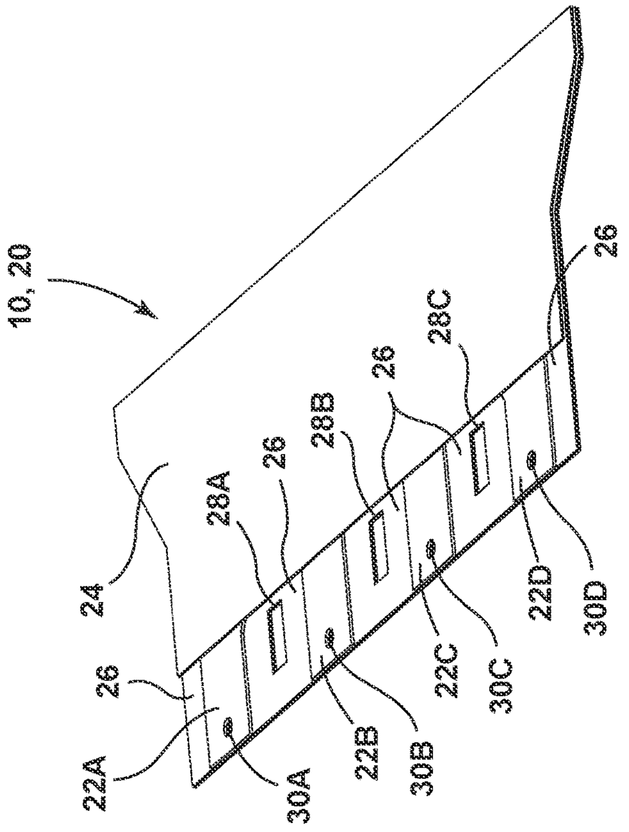
FIG. 2 is a partial perspective view generally illustrating an embodiment of a flat cable according to teachings of the present disclosure.
Figure 4:
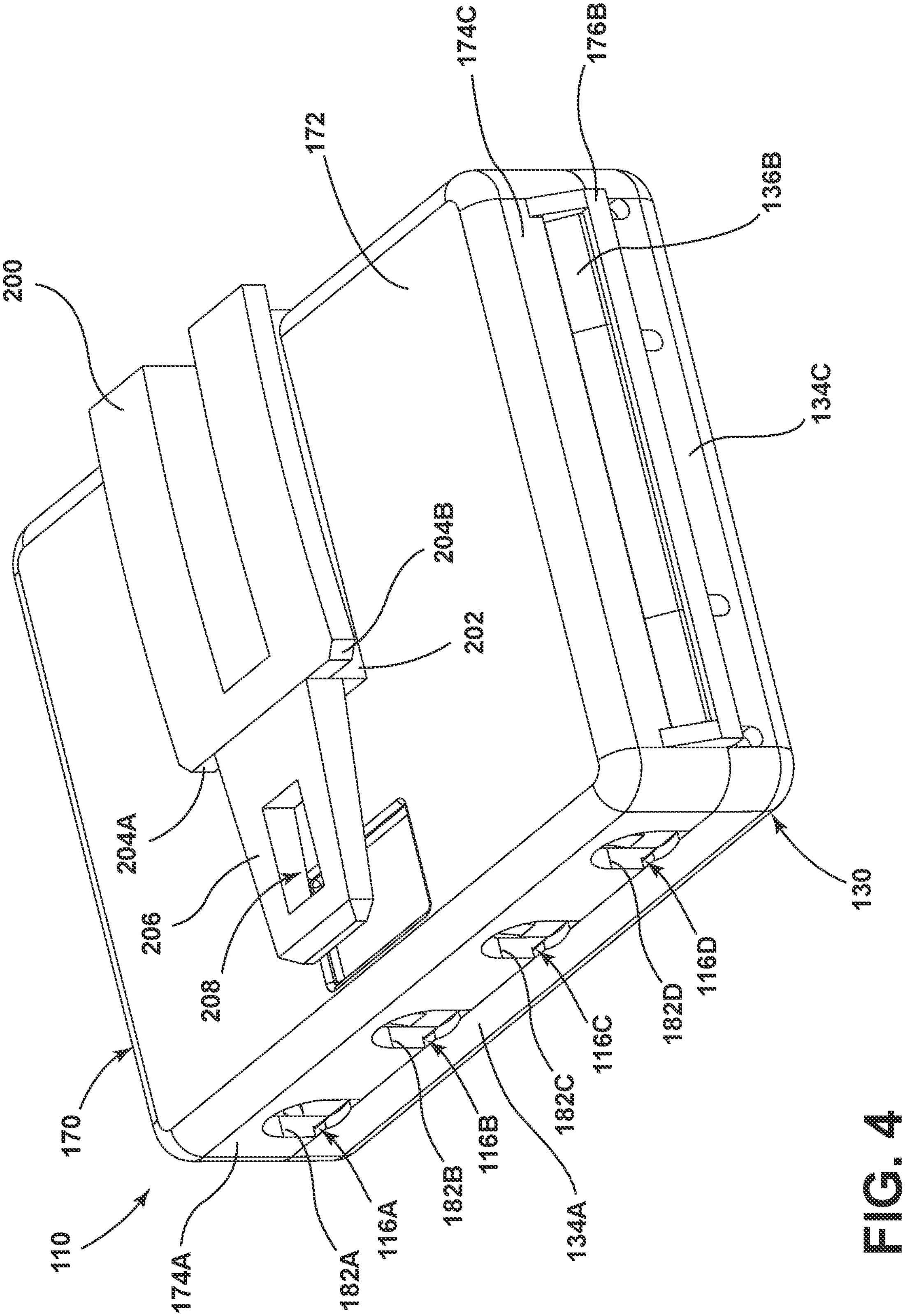
FIGS. 4 and 5 are perspective views generally illustrating an embodiment of an adapter module according to teachings of the present disclosure.

The flat cable 20 depicted in FIGS. 2 and 8-10 is representative of each of the flat cables $20_1$, $20_2$ of FIG. 1. As generally illustrated in FIG. 2, the flat cable 20 is flexible and has a substantially rectangular cross-section, though other suitable configurations (e.g., nonflexible) and/or cross-sectional shapes (e.g., polygonal, trapezoidal, octagonal) are possible. The flat cable 20 includes one or more electrical conductors 22A-22D overmolded and/or embedded within an insulating material 24 that electrically insulates the conductors 22A-22D from each other and/or from other components. Optionally, the flat cable 20 also includes a reinforcement body 26 that is connected to and/or embedded within the insulating material 24. The conductors 22A-22D are disposed substantially parallel with each other and/or substantially aligned in a common plane. The flat cable 20 also includes a plurality of slots 28A-28C configured to receive a respective retention protrusion 142A-142C of the first housing shell 130. The slots 28A-28C are each disposed in and/or defined by the insulating material 124 and the reinforcement body 126, such as between adjacent conductors 22A-22D. The slots 28A-28C receive and engage the retention protrusions 142A-142C of the first housing shell 130 (see FIGS. 8 and 10), which connects the flat cable 20 to the first housing shell 130 and/or the adapter module 110 (to at least an extent) and restricts and/or prevents removal of the flat cable 20 from the cable opening 114. The flat cable 20 further includes a plurality of terminal recesses 30A-30D that are each configured to receive a nub 58 of a wire terminal 46 of a respective wire 40A-40D. The terminal recesses 30A-30D are each disposed in and/or defined by an exposed portion of a respective conductor 22A-22D. The terminal recesses 30A-30D receive and engage the nubs 58 of the wire terminals 46 of the wires 40A-40D (see FIG. 10) establishing an electrical connection between the wires 40A-40D and the flat cable 20, while also restricting and/or resisting movement of the wire terminals 46 relative to the conductors 22A-22D. As a result, a more secure and stable physical and electrical connection is established between (i) each wire terminal 26 and the respective conductor 22A-22D and (ii) the wires 40A-40D and the flat cable 20.

Figure 3A:
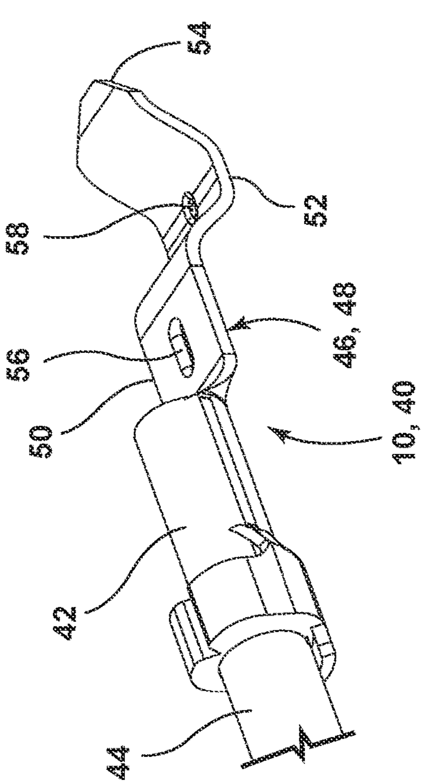
FIGS. 3A and 3B are partial perspective views generally illustrating an embodiment of a wire including a wire terminal according to teachings of the present disclosure.
Figure 3B:
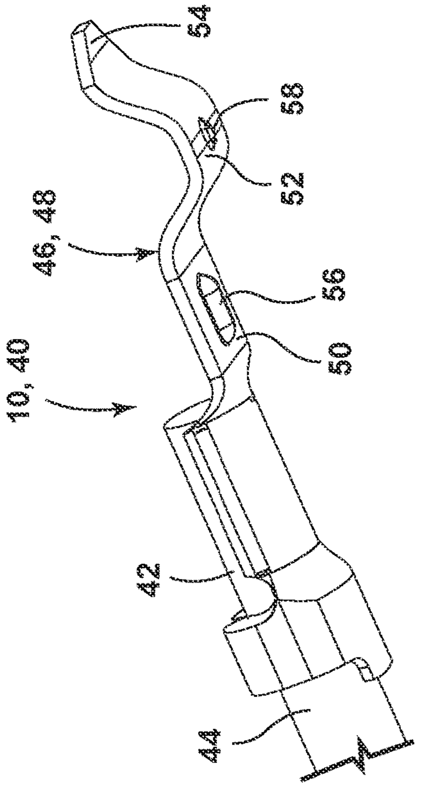
Figure 8:
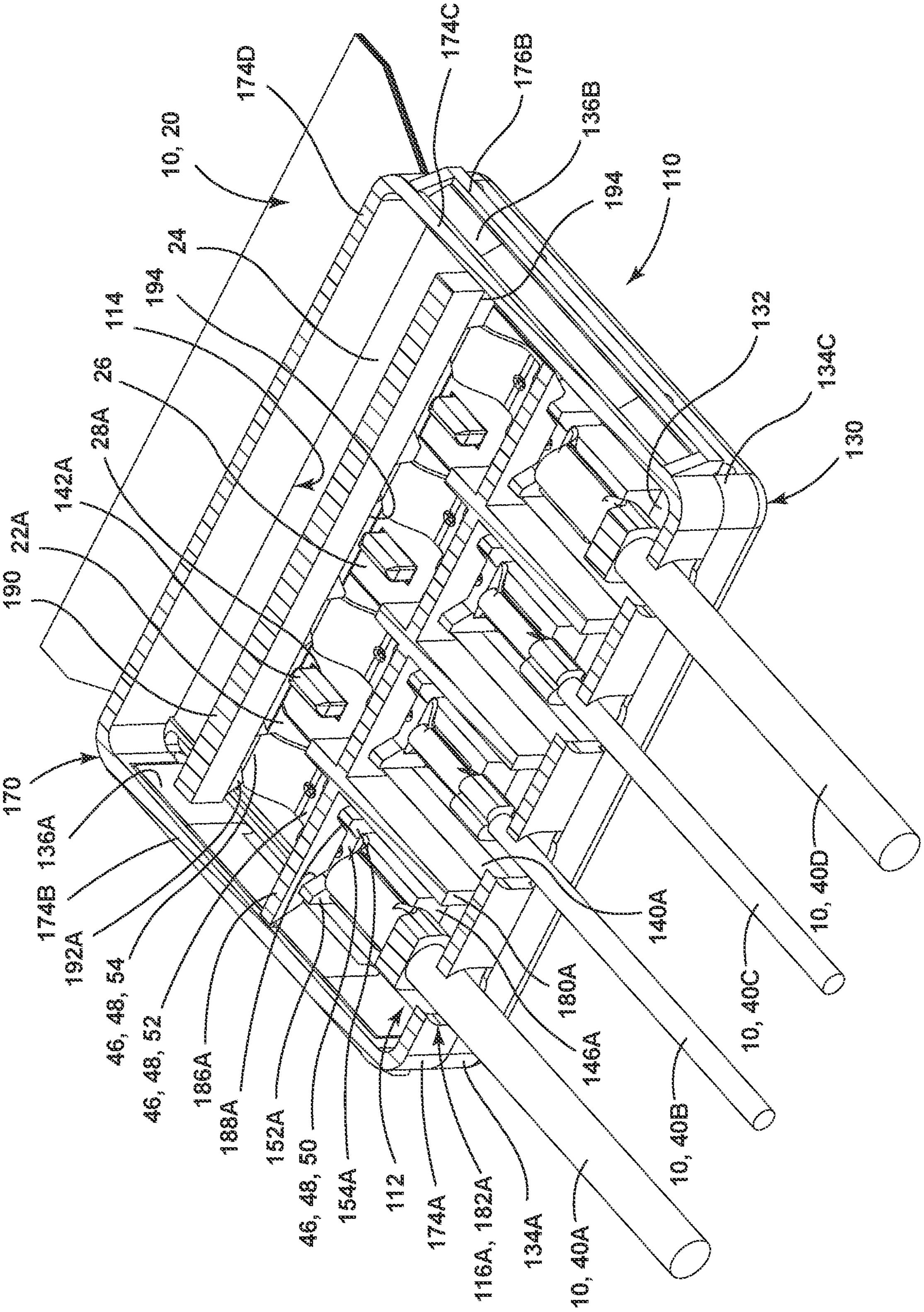
FIGS. 8, 9, and 10 are cross-sectional perspective views generally illustrating an embodiment of an adapter module engaging a plurality of wires and a flat cable according to teachings of the present disclosure.
Figure 9:
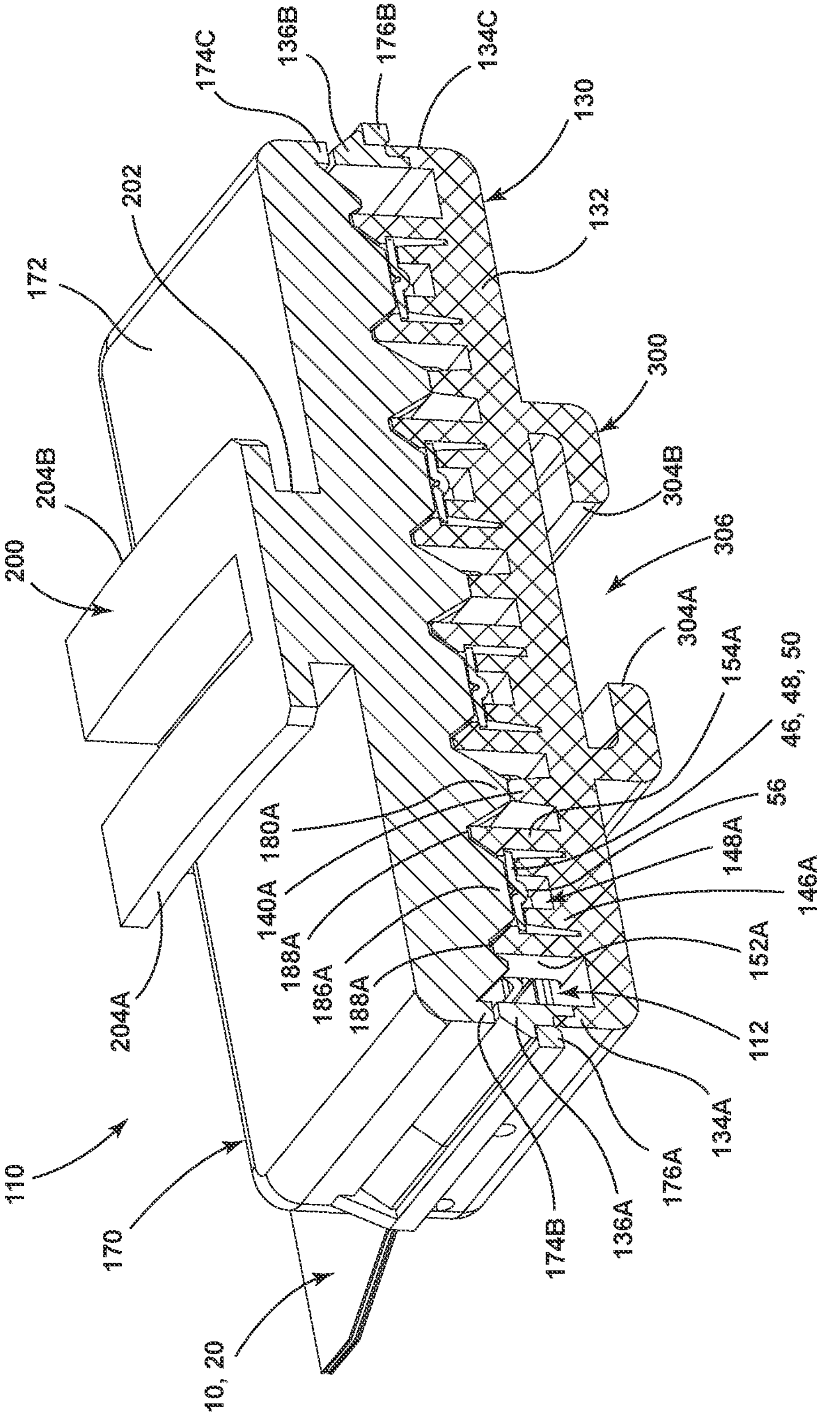
Figure 10:
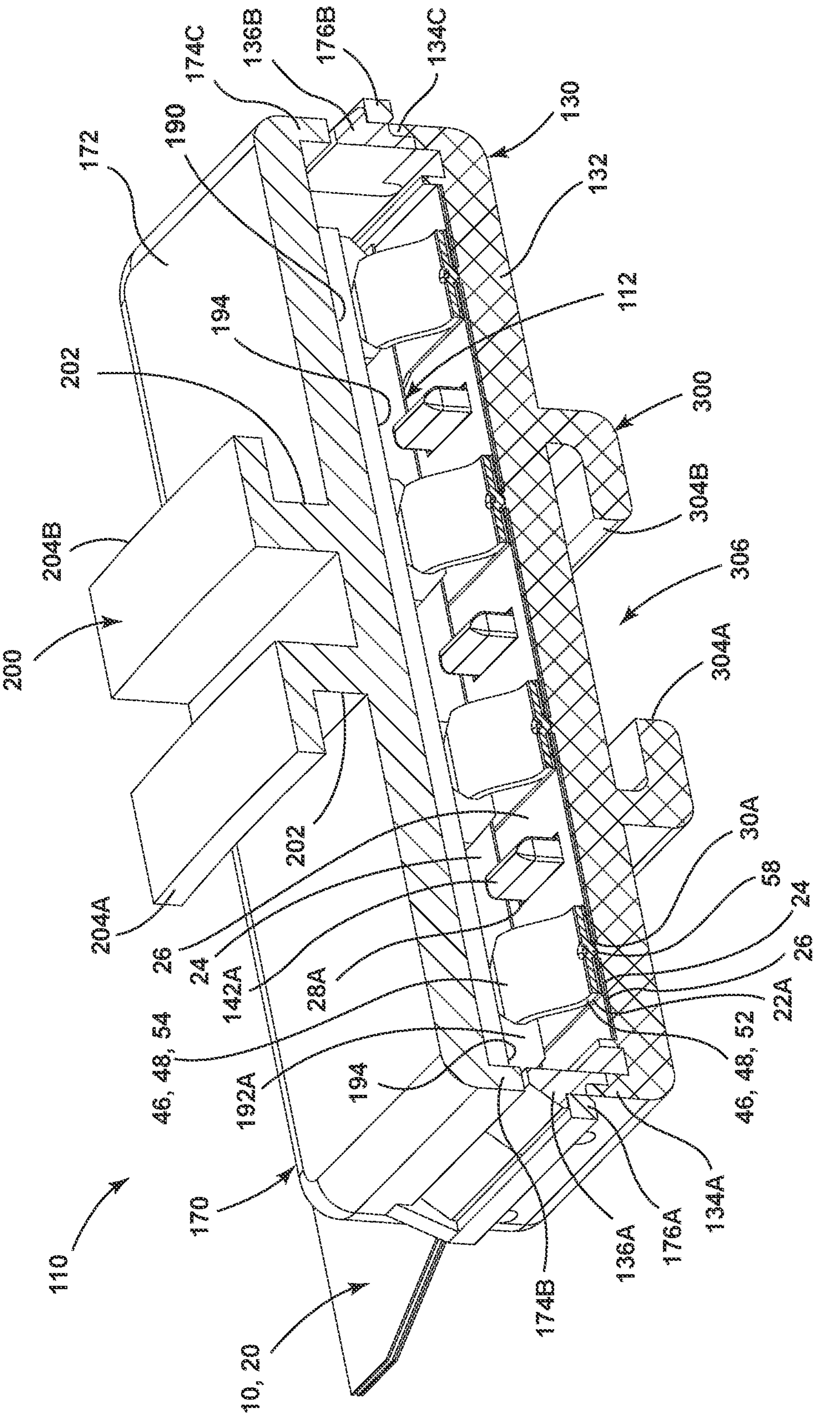

The wire 40 depicted in FIGS. 3A and 3B is representative of each of the wires $40A_1$-$40D_1$, $40A_2$-$40D_2$ of FIG. 1 and the wires 40A-40D of FIGS. 8-10. As generally illustrated in FIGS. 3A and 3B, the wire 40 is flexible and has a round and/or substantially circular cross-section, though other suitable configurations (e.g., nonflexible) and/or cross-sectional shapes (e.g., polygonal, trapezoidal, octagonal) are possible. The wire 40 includes an electrical conductor 42 overmolded and/or embedded within an insulating material 44 that electrically insulates the conductor 42 from other components. The wire 40 also includes a wire terminal 46 that is connected to the insulating material 44 and/or the conductor 42. The wire terminal 46 includes a terminal body 48, a protuberance 56, and a nub 58. The terminal body 48 includes a latching portion 50, a contact portion 52, and a biasing portion 54. The protuberance 56 is disposed on and projects transversely from the latching portion 50 of the terminal body 48 (e.g., in the stacking direction). The protuberance 56 is received in and engages the depression 148A-148D of a respective terminal support 146A-146D of the first housing shell 130 (see FIGS. 9 and 10) and, to at least an extent, restricts movement of the wire terminal 46 relative to the respective terminal support 146A-146D. The nub 58 is disposed on and projects transversely from the contact portion 52 of the terminal body 48 (e.g., in the stacking direction). The nub 58 is received in and engages the terminal recess 30A-30D of a respective conductor 22A-22D of the flat cable 20 (see FIGS. 8 and 10) establishing an electrical connection therebetween, while also restricting movement of the wire terminal 46 relative to the respective conductor 22A-22D to at least an extent. The protuberance 56 and nub 58 are each structured as embossments of the terminal body 48 and, thus, are formed and defined by portions of the terminal body 48. Nevertheless, the protuberance 56 and/or nub 58 may alternatively be configured and/or structured as a protrusion, projection, extension, or other type of suitable body. The latching portion 50 is disposed at a fixed end of the wire terminal 46 and is connected to the conductor 42. The latching portion 50 is structured in a complimentary manner to a respective pair of latches 152A-152D, 154A-154D of the first housing shell 130 and is engaged by the respective pair of latches 152A-152D, 154A-154D to secure the wire 40 and the wire terminal 46 to a respective terminal support 146A-146D, the first housing shell 130, and/or the adapter module 110 (see FIGS. 8 and 9). The contact portion 52 extends between and connects the latching portion 50 and the biasing portion 54. The contact portion 52 is offset from the latching portion 50 and the biasing portion 54 in a direction toward the first housing shell 130 (e.g., in the stacking direction), and contacts, abuts, rests on, and/or engages a respective conductor 22A-22D of the flat cable 20 (see FIGS. 8 and 10). The biasing portion 54 is disposed at a free end of the terminal body 48. The biasing portion 54 is contacted and/or pressed on by the cable rib 190 and/or the lip 194 (e.g., toward the first housing shell 130 and/or the respective conductor 22A-22D in the stacking direction) thereby (i) biasing the contact portion 52 of the wire terminal 46 against the respective conductor 22A-22D, (ii) restricting and/or preventing movement of the wire terminal 46 away from the respective conductor 22A-22D, and/or (iii) restricting and/or preventing removal of the nub 58 from the terminal recess 30A-30D of the respective conductor 22A-22D (see FIGS. 8 and 10).

The adapter module 110 depicted in FIGS. 4-10 is representative of each adapter module $110_1$, $110_2$ of FIG. 1. As generally shown in FIGS. 8-10, the adapter module (i) accommodates, receives, supports, and/or is connected to a respective group and/or subset of conductor members 10 (e.g., flat cable 20 and wires 40A-40D), (ii) facilitates and/or guides connecting of the flat cable 20 and the wires 40A-40D together, and (iii) enhances, reinforces and/or strengthens a connection of the flat cable 20 and the wires 40A-40D to one another. An adapter module 110, $110_1$, $110_2$ may additionally and/or alternatively be considered, referred to, and/or claimed as an adapter, an electrical adapter, an adapter unit, a housing, and/or a connection unit, among other suitable and appropriate nomenclatures.

As generally illustrated in FIGS. 4-8, the adapter module 110 includes an interior space 112, a cable opening 114, a plurality of wire openings 116A-116D, a first housing shell 130, and a second housing shell 170. The housing shells 130, 170 are separate and independent components and/or bodies. The housing shells 130, 170 are composed of a plastic material, but may additionally and/or alternatively be composed of and/or include one or more other materials such as a metal, rubber, ceramic, and/or composite. The housing shells 130, 170 are releasably and/or removably connectable to one another via complimentary fasteners 136A, 136B, 176A, 176B. The internal space 112, the cable opening 114, and the wire openings 116A-116D are defined by and between the housing shells 130, 170. The cable opening 114 removably receives at least a portion of the flat cable 20 and/or the flat cable 20 extends into the internal space 112 via the cable opening 114. The wire openings 116A-116D each removably receive at least a portion of a respective wire 40A-40D and/or the wires 40A-40D each extend into the internal space 112 via a respective wire opening 116A-116D. The adapter module 110 may be considered and/or referred to being in an assembled configuration and/or a use configuration when the housing shells 130, 170 are connected and the adapter module 110 is engaged and/or connected to the respective flat cable 20 and the respective wires 40A-40D (i.e., the respective flat cable 20 is disposed in the cable opening 114 and the respective wires 40A-40D are disposed in the wire openings 116A-116D).

As generally illustrated in FIGS. 4-6A, 7A, 9, and 10, the adapter module 110 includes one of the male connectors 200 and one of the female connectors 300. The male and female connector 200, 300 project outward from the adapter module 110 and/or the housing shells 130, 170 and are disposed outside of the interior space 112 of the adapter module 110. The male connector 300 is disposed on and/or connected to one of the housing shells 130, 170 (e.g., the second housing shell 170) and the female connector 300 is disposed on and/or connected to the other one of the housing shells 130, 170 (e.g., the first housing shell 130). In other words, the first housing shell 130 includes one of the male connector 200 and the female connector 300 and the second housing shell 170 includes the other one of the male connector 200 and the female connector 300. Therefore, the first housing shell 130 of the adapter module 110 is releasably connectable to the second housing shell 170 of one or more other adapter modules 110 and/or to a mount 400 that includes a complimentary connector (e.g., one of the female connectors 300). The second housing shell 170 of the adapter module 110 is releasably connectable to the first housing shell 130 of one or more other adapter modules 110 and/or to a mount 400 that includes a complimentary connector (e.g., one of the male connectors 200).

As generally illustrated in FIGS. 4, 5, 7A, 9, and 10, the male connector 200 is configured in a complimentary manner to one or more female connectors 300 (e.g., the female connector $\mathbf{300}_1$, $\mathbf{300}_2$ of each adapter module $\mathbf{110}_1$, $\mathbf{110}_2$ and/or mount 400 of the assembly 100). The male connector 200 adjustably (e.g., slidably) and releasably engages a female connector 300 to connect the adapter module 110 to another adapter module 110 and/or the mount 400. At least a portion of the male connector 200 is insertable into and removable from the female connector 300 (e.g., the attachment receptacle 306) in a connection direction. Additionally, the male connector 200 receives and releasably engages a portion of the female connector 300 (e.g., the tab 302). The male connector 200 includes a main portion 202, a pair of guide rails 204A, 204B, and an attachment flange 206. The main portion 202 is disposed on, connected to, and/or projects outwardly from the base 172 of the second housing shell 170 (e.g., in the stacking direction). The attachment flange 206 is disposed at the free end of the main portion 202 and is disposed spaced apart from the base 172 of the second housing shell 170. The attachment flange 206 projects from the main portion 202 generally toward the wire openings 116A-116D and/or the wire apertures 182A-182D (e.g., in the connection direction). The attachment flange 206 includes and defines a flange recess 208 that receives and engages the tab 302 of the female connector 300. The attachment flange 206 is configured to elastically deform and/or flex away from the second housing shell 170 (e.g., in the stacking direction) when engaging and disengaging the tab 302 of the female connector 300. The pair of guide rails 204A, 204B are slidably engageable with the pair of tracks 304A, 304B of the female connector 300. The pair of guide rails 204A, 204B includes a first lateral protrusion and/or rail 204A and a second lateral protrusion and/or rail 204B. The lateral protrusions 204A, 204B are disposed at a free end of the main portion 202 and are disposed spaced apart from the base 172 of the second housing shell 170. The lateral protrusions 204A, 204B protrude laterally (e.g., transversely and/or perpendicularly) from opposite sides of the main portion 202 (e.g., transversely and/or perpendicularly to the stacking direction and the connection direction) such that the main portion 202 and the lateral projections 204A, 204B form and/or define a T-shaped cross-sectional profile. The lateral protrusions 204A, 204B each adjustably (e.g., slidably) engage a respective L-shaped projection 304A, 304B of the female connector 300. The lateral protrusions 204A, 204B, together with the L-shaped projections 304A, 304B, guide the attachment flange 206 into engagement with the tab 302 when engaging the male and female connector 200, 300.

As generally illustrated in FIGS. 4, 5, 6A, 9, and 10, the female connector 300 is configured in a complimentary manner to one or more male connectors 200 (e.g., the male connector $\mathbf{200}_1$-$\mathbf{200}_3$ of each adapter module $\mathbf{110}_1$, $\mathbf{110}_2$ and/or mount 400 of the assembly 100). The female connector 300 adjustably (e.g., slidably) and releasably receives and/or engages a male connector 200 to connect the adapter module 110 to another adapter module 110 and/or the mount 400. At least a portion of the male connector 200 is insertable into and removable from the female connector 300 in the connection direction. Additionally, at least a portion of the female connector 300 is received in and releasably engaged by the male connector 200. The female connector 300 includes a tab 302 and a pair of tracks 304A, 304B. The pair of tracks 304A, 304B includes and/or is defined by one or more opposing L-shaped projections (e.g., a first L-shaped projection and/or track 304A, a second L-shaped projection and/or track 304B. The L-shaped projections 304A, 304B and the tab 302 are disposed on, connected to, and/or project outwardly from the base 132 of the first housing shell 130 (e.g., in the stacking direction). The L-shaped projections 304A, 304B collectively define an attachment receptacle 306 that receives at least a portion of the male connector 200. The L-shaped projections 304A, 304B face one another and each receive and adjustably (e.g., slidably) engage a respective lateral protrusion 204A, 204B of the male connector 200. The tab 302 is disposed adjacent to the L-shaped projections 304A, 304B and is configured to be received in and engage (e.g., snap into engagement with) the attachment flange 206 of the male connector 200. The tab 302 is disposed in alignment with the attachment receptacle 306 (e.g., in the connection direction) and/or, in other non-depicted embodiments, projects into the attachment receptacle 306.

As generally illustrated in FIGS. 4-6B, and 8-10, the first housing shell 130 is releasably connectable to the second housing shell 170. The first housing shell 130 includes a base 132 and one or more sidewalls (e.g., a first, second, and third sidewall 134A-134C). The sidewalls 134A-134C project from the base 132 (e.g., in the stacking direction) and extend at least partially around an outer perimeter of the base 132. The first housing shell 130 further includes a plurality of first fasteners 136A, 136B that are connected to, disposed on, and/or protrude from the base 132 and/or a respective one of the second and third sidewalls 134B, 134C (e.g., in the stacking direction). The first fasteners 136A, 136B are configured in a complimentary manner to second fasteners 176A, 176B of the second housing shell 170 and releasably engage the second fasteners 176A, 176B to releasably connect the housing shells 130, 170 together.

Figure 6A:
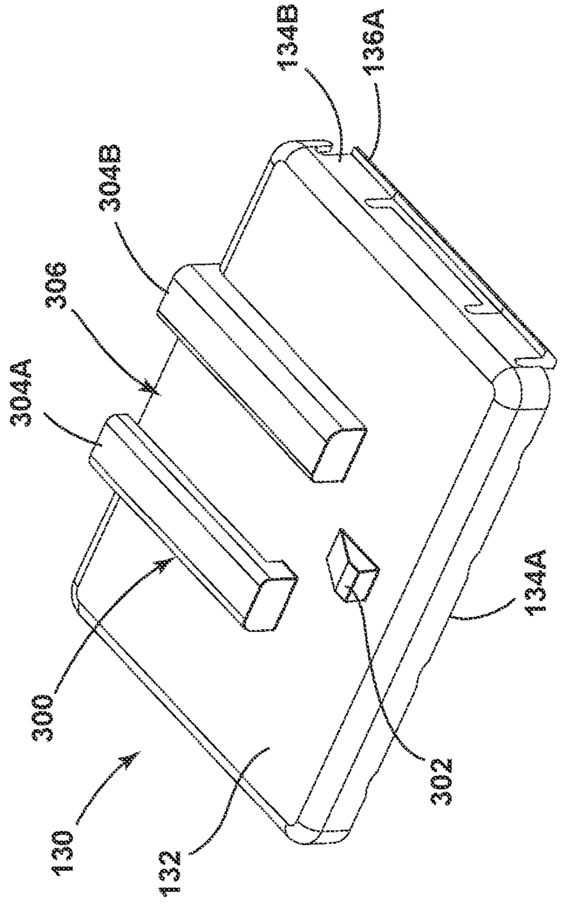
FIGS. 6A and 6B are perspective views generally illustrating an embodiment of a first housing shell of an adapter module according to teachings of the present disclosure.
Figure 6B:
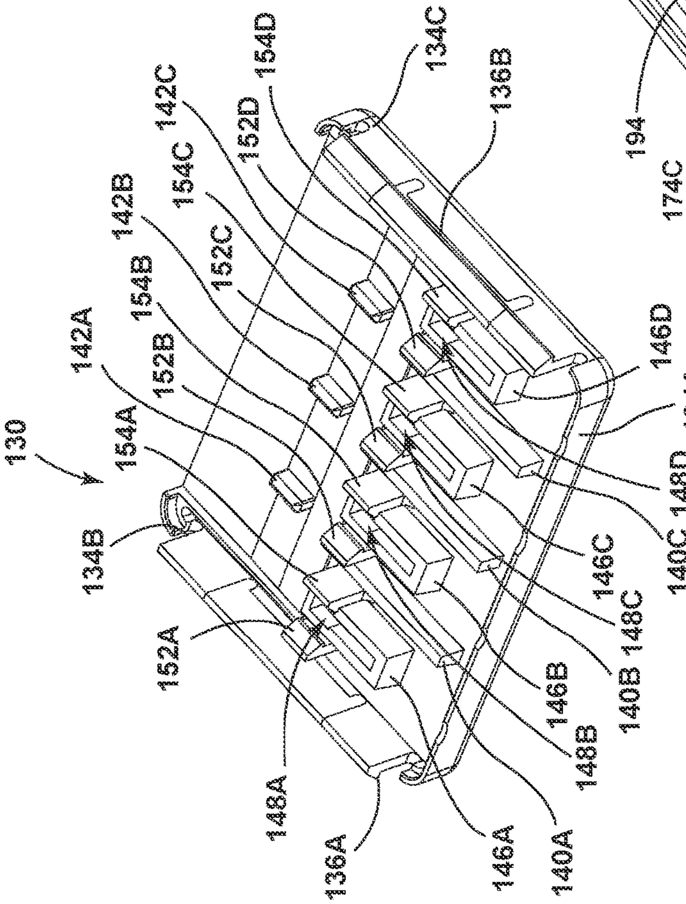

As generally illustrated in FIGS. 6B, 8, and 9, the first housing shell 130 includes a plurality of support walls 140A-140C. The support walls 140A-140C are disposed on and project transversely (e.g., perpendicularly) from the base 132 toward the second housing shell 170 (e.g., in the stacking direction). The support walls 140A-140C extend longitudinally along the base 132 transversely (e.g., perpendicularly) to the first sidewall 134A and/or substantially parallel to the axis of the cable opening 114 (e.g., in the connection direction). The support walls 140A-140C are each disposed in alignment with a respective retention protrusion 142A-142C (e.g., in the connection direction) and/or a respective support wall 180A-180C of the second housing shell 170 (e.g., in the stacking direction) at least when the adapter module 110 is in the assembled configuration. The support walls 140A-140C are each disposed between a respective pair of adjacent terminal supports 146A-146D and/or a respective pair of latches 152A-152D, 154A-154D (e.g., the first latch 152A-152D of one latch pair and the second latch 154A-154D of another adjacent latch pair). When the housing shells 130, 170 are connected, the support walls 140A-140C each contact, abut, and/or rest on a respective support wall 180A-180C of the second housing shell 170 (e.g., in the stacking direction). In this manner, the support walls 140A-140C contact and support the second housing shell 170 and increase the structural integrity of the adapter module 110 (e.g., resist and/or mitigate deformation and/or flexing of the bases 132, 172 of the housing shells 130, 170; resist and/or prevent crushing of the adapter module 110).

As generally illustrated in FIGS. 6B, 8, and 10, the first housing shell 130 includes a plurality of retention protrusions 142A-142C. The retention protrusions 142A-142C are disposed on and project transversely (e.g., perpendicularly) from the base 132 toward the second housing shell 170 (e.g., in the stacking direction). The retention protrusions 142A-142C extend longitudinally along the base 132 transversely (e.g., perpendicularly) to the first sidewall 134A and/or substantially parallel to an axis of the cable opening 114 (e.g., the connection direction). The retention protrusions 142A-142C are each disposed in alignment with a respective slot 28A-28C of the flat cable 20 (e.g., in the stacking direction) and/or a respective support wall 140A-140C (e.g., in the connection direction) at least when the adapter module 110 is in the assembled configuration. When the adapter module 110 is in the assembled configuration, the retention protrusions 142A-142C are each disposed in and/or engage a respective slot 28A-28C of the flat cable 20, which connects and/or secures the flat cable 20 to the first housing shell 130 and/or the adapter module 110 (to at least an extent) and restricts and/or prevents removal of the flat cable 20 from the cable opening 114.

As generally illustrated in FIGS. 6B, 8, and 9, the first housing shell 130 includes a plurality of terminal supports 146A-146D that each support the wire terminal 46 of a respective wire 40A-40D. The terminal supports 146A-146D are disposed on and project transversely (e.g., perpendicularly) from the base 132 toward the second housing shell 170 (e.g., in the stacking direction). The terminal supports 146A-146D are each disposed in alignment with a respective wire aperture 182A-182D and a respective terminal rib 186A-186D (e.g., in the connection direction) when the housing shells 130, 170 are connected. The terminal supports 146A-146D extend longitudinally along the base 132 substantially parallel to an axis of the respective wire aperture 182A-182D and/or an axis of the cable opening 114 (e.g., the connection direction) and/or transversely (e.g., perpendicularly) to the first sidewall 134A. When the adapter module 110 is in the assembled configuration, the wire terminal 46 of each wire 40A-40D is disposed on and supported by a respective terminal support 146A-146D, and are secured on the respective terminal support 146A-146D by a respective pair of latches 152A-152D, 154A-154D. Each terminal support 146A-146D includes and/or defines a depression 148A-148D that receives and engages the protuberance 56 of the wire terminal 46 of the respective wire 40A-40D, which, to at least an extent, restricts movement of the respective wire terminal 46 relative to the terminal support 146A-146D, the first housing shell 130, and/or the adapter module 110. The depression 148A-148D opens towards the second housing part 170 (e.g., in the stacking direction) and is at least partially aligned with a respective terminal rib 186A-186D (e.g., in the stacking direction) at least when the adapter module 110 is in the assembled configuration.

As generally illustrated in FIGS. 6B, 8, and 9, the first housing shell 130 includes a plurality of latches 152A-152D, 154A-154D configured to engage the wire terminals 46 of the wires 40A-40D. The latches 152A-152D, 154A-154D are disposed on and project transversely (e.g., perpendicularly) from the base 132 toward the second housing shell 170 (e.g., in the stacking direction). The latches 152A-152D, 154A-154D each include a latching nose disposed at or about and projecting from a free end of the respective latch 152A-152D, 154A-154D. The plurality of latches 152A-152D, 154A-154D includes a plurality of latch pairs (e.g., a first latch pair 152A, 154A; a second latch pair 152B, 154B; etc.) that each contact and/or engage the wire terminal 46 of a respective wire 40A-40D and connect, fasten, and/or secure the respective wire terminal 46 to and/or on a respective terminal support 146A-146D, the first housing shell 130, and/or the adapter module 110. Each latch pair includes a first latch 152A-152D and a second latch 154A-154D that simultaneously contact and/or engage the respective wire terminal 46 (e.g., via their latching noses). The first and second latch 152A-152D, 154A-154D of each latch pair are disposed on opposite sides of the respective terminal support 146A-146D and face toward one another. The first latches 152A-152D and the second latches 154A-154D are substantially mirror images of one another, but may alternatively be configured differently than one another in other embodiments. When connecting a wire 40A-40D to the first housing shell 130 and/or the adapter module 110, the wire terminal 46 of the wire 40A-40D is pressed against the sloped surfaces of the latching noses of the respective latching pair (e.g., in the stacking direction and/or toward the terminal support 146A-146D), which causes the first and second latches 152A-152D, 154A-154D of the latching pair to elastically deform and/or flex away from one another (e.g., transversely to the connection direction and the stacking direction) to allow the wire terminal 46 to be disposed on the respective terminal support 146A-146D.

As generally illustrated in FIGS. 4, 5, 7A, 7B, and 8-10, the second housing shell 170 is releasably connectable to the first housing shell 130. The second housing shell 170 includes a base 172 and one or more sidewalls (e.g., a first, second, third, and fourth sidewall 174A-174D). The sidewalls 174A-174D project from the base 172 (e.g., in the stacking direction) and extend at least partially around an outer perimeter of the base 172. The second housing shell 170 further includes a plurality of second fasteners 176A, 176B that are connected to, disposed on, and/or protrude from the base 172 and/or a respective one of the second and third sidewalls 174B, 174C (e.g., in the stacking direction). The second fasteners 176A, 176B are configured in a complimentary manner to the first fasteners 136A, 136B of the first housing shell 130 and releasably engage the first fasteners 136A, 136B to releasably connect the housing shells 130, 170 together.

Figure 7B:
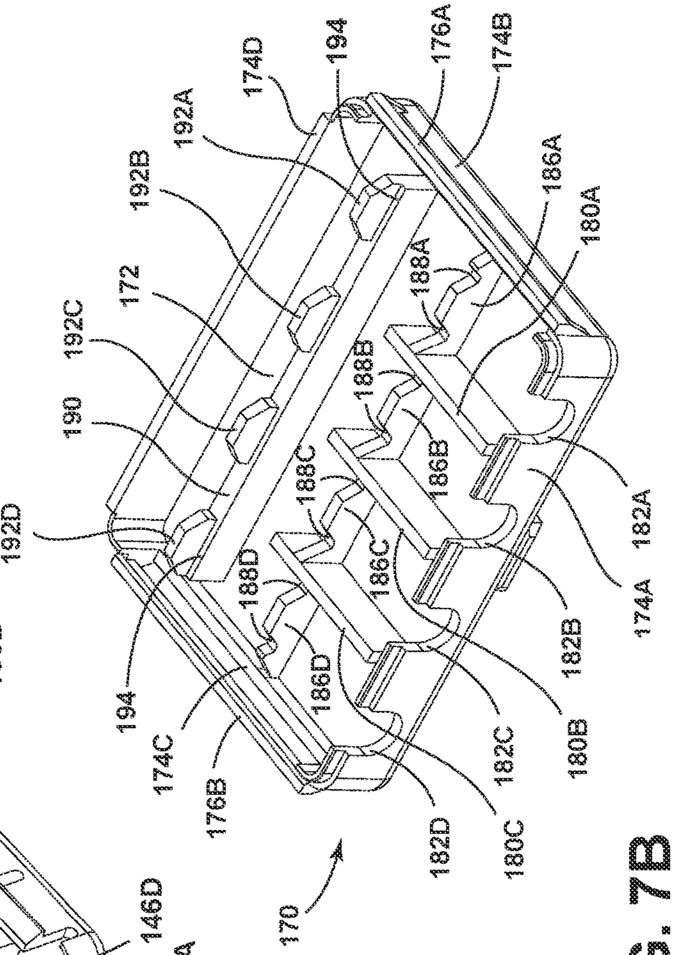

As generally illustrated in FIGS. 7B, 8, and 9, the second housing shell 170 includes a plurality of support walls 180A-180C. The support walls 180A-180C are disposed on and project transversely (e.g., perpendicularly) from the base 172 toward the first housing shell 130 (e.g., in the stacking direction). The support walls 180A-180C extend longitudinally along the base 172 transversely (e.g., perpendicularly) to the first and fourth sidewalls 174A, 174D and/or substantially parallel to the axis of the cable opening 114 (e.g., in the connection direction). The support walls 180A-180C are each disposed in alignment with a respective support wall 140A-140C of the first housing shell 130 (e.g., in the stacking direction) at least when the housing shells 130, 170 are connected. The support walls 180A-180C are each disposed between a respective pair of adjacent terminal ribs 186A-186D and/or a respective pair of adjacent wire apertures 182A-182D. The support walls 180A-180C extend between and connect the respective pair of adjacent terminal ribs 186A-186D, which enhances the strength and rigidity of the terminal ribs 186A-186D to at least an extent. When the housing shells 130, 170 are connected, the support walls 180A-180C each contact, abut, and/or rest on a respective support wall 140A-140C of the first housing shell 130 (e.g., in the stacking direction). In this manner, the support walls 180A-180C contact and support the first housing shell 130 and increase the structural integrity of the adapter module 110 (e.g., resist and/or mitigate deformation and/or flexing of the bases 132, 172 of the housing shells 130, 170; resist and/or prevent crushing of the adapter module 110).

As generally illustrated in FIGS. 7B, 8, and 9, the second housing shell 170 includes a plurality of wire apertures 182A-182D that are disposed in and defined by the first sidewall 174A. The wire apertures 182A-182D project into the first sidewall 174A toward the base 172 (e.g., in the stacking direction) from a free end of the first sidewall 174A. When the housing shells 130, 170 are connected, the free end of the first sidewall 174A contacts and/or is disposed adjacent to free end of the first sidewall 134A of the first housing shell 130 such that the first sidewall 134A and/or the first housing shell 130 closes the wire apertures 182A-182D to form the wire openings 116A-116D (i.e., the wire openings 116A-116D are defined by and between the first sidewalls 134A, 174A of the housing shells 130, 170).

Figure 5:
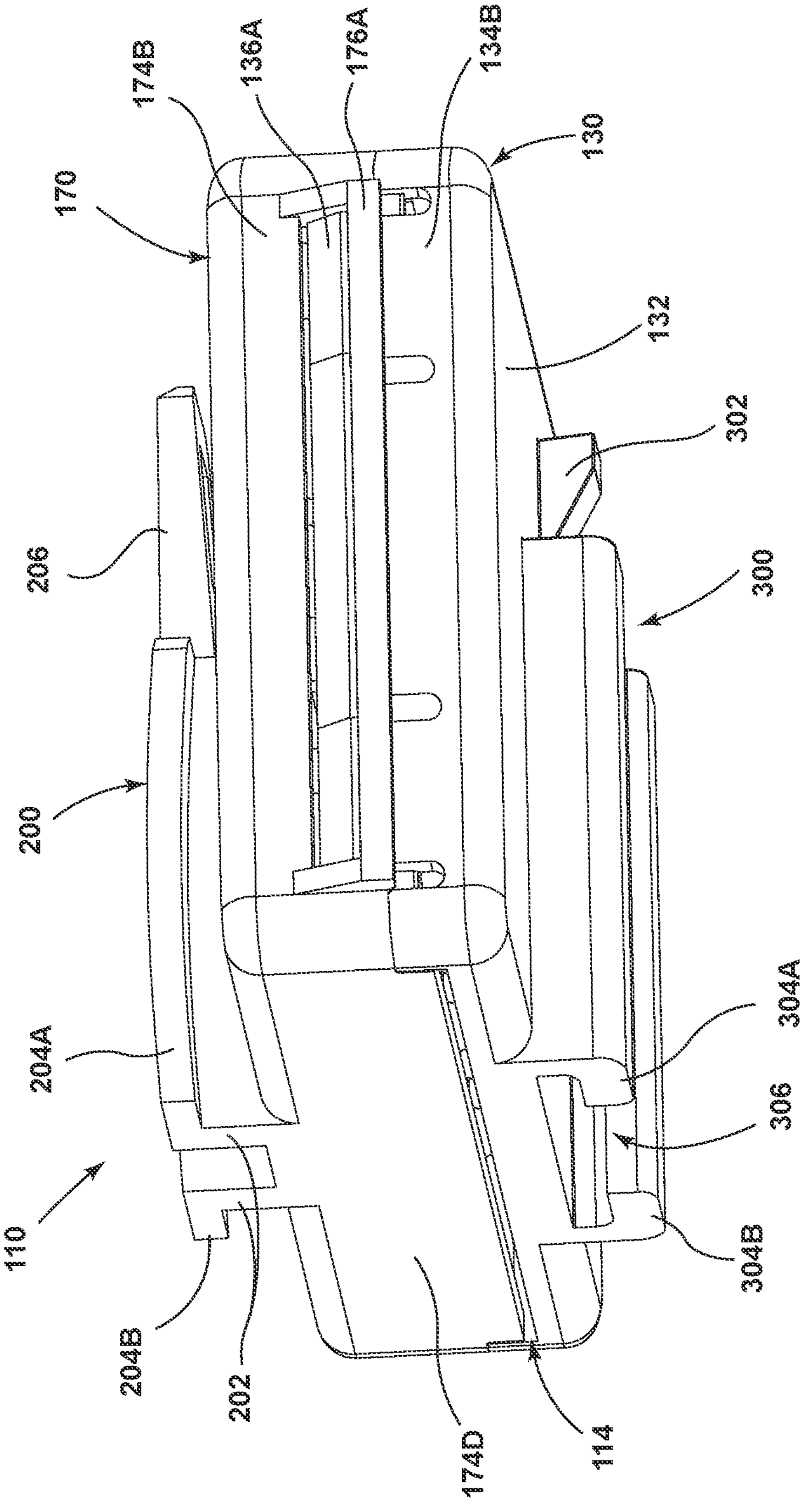
Figure 7A:
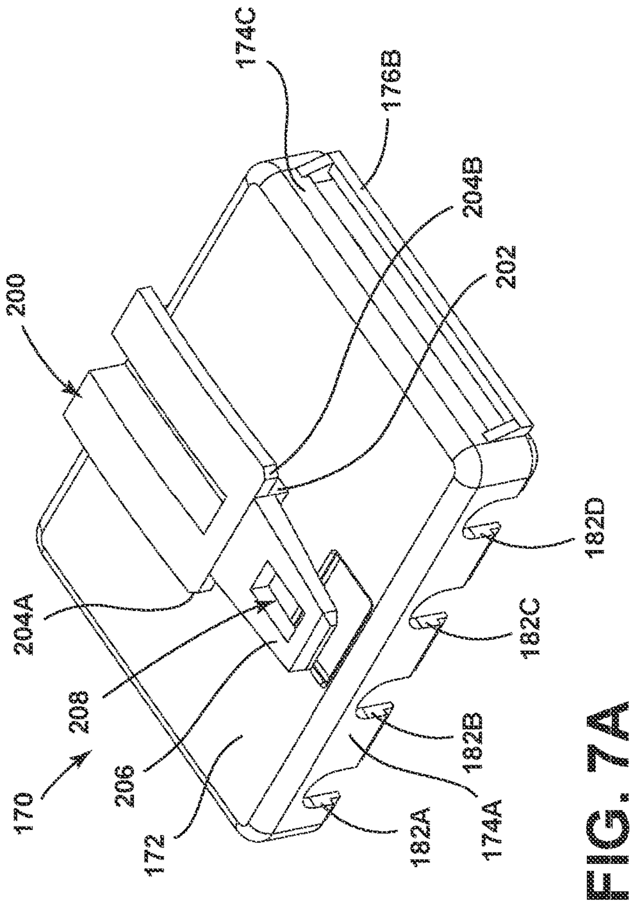
FIGS. 7A and 7B are perspective views generally illustrating an embodiment of a second housing shell of an adapter module according to teachings of the present disclosure.

As generally illustrated in FIGS. 5, 7B, and 8, the fourth sidewall 174D of the second housing shell 170 is disposed opposite the first sidewall 174A and at least partially defines the cable opening 114. When the housing shells 130, 170 are connected, the fourth sidewall 174D contacts, presses against, and/or is disposed in close proximity to the flat cable 20 such that, for example, the flat cable 20 is disposed and/or sandwiched between the fourth sidewall 174D and the base 132 of the first housing shell 130.

As generally illustrated in FIGS. 7B, 8, and 9, the second housing shell 170 includes a plurality of terminal ribs 186A-186D that restrict disengagement of the latches 152A-152D, 154A-154D and the wire terminals 46 of the wires 40A-40D. The terminals ribs 186A-186D are disposed on and project transversely (e.g., perpendicularly) from the base 172 toward the first housing shell 130 (e.g., in the stacking direction). The terminal ribs 186A-186D are each disposed in alignment with a respective wire aperture 182A-182D and a respective terminal support 146A-146D (e.g., in the connection direction) at least when the adapter module 110 is in the assembled configuration. The terminals ribs 186A-186D extend longitudinally along the base 172 transversely (e.g., perpendicularly) to an axis of the respective wire aperture 182A-182D and/or an axis of the cable opening 114 (e.g., the connection direction) and/or substantially parallel to the first and fourth sidewalls 174A, 174D. Each terminal rib 186A-186D includes notches 188A-188D that receive (e.g., in the stacking direction) and engage at least a portion of a respective pair of latches 152A-152D, 154A-154D of the first housing shell 130 when the housing shells 130, 170 are connected, which restricts and/or prevents the latches 152A-152D, 154A-154D from adjusting and/or flexing away from one another (e.g., transversely to the connection direction and the stacking direction) and/or from disengaging the respective wire terminal 46. Each terminal rib 186A-186D has a free end that is at least partially disposed between the respective pair of latches 152A-152D, 154A-154D and that contacts and/or is disposed in close proximity to the respective wire terminal 46 (e.g., the latching portion 50 thereof) when the adapter module 110 is in the assembled configuration, which (i) restricts movement of the respective wire terminal 46 relative to the terminal support 146A-146D to at least an extent and (ii) restricts and/or prevents removal of the protuberance 56 of the respective wire terminal 46 from the depression 148A-148D of the terminal support 146A-146D. In addition, if one or more of the wire terminals 46 is not properly seated on the respective terminal support 146A-146D and/or is not properly engaged with the respective latches 152A-152D, 154A-154D when attempting to connect the housing shells 130, 170, the corresponding terminal rib 186A-186D contacts and/or abuts the improperly seated and/or engaged wire terminal 46 and presses it against the associated terminal support 146A-146D, which effectively prevents and/or blocks further adjustment and/or movement of the housing shells 130, 170 in the stacking direction. This in turn prevents and/or blocks the first and second fasteners 136A, 136B, 176A, 176B from being adjusted and/or moved into engagement with one another and, thus, prevents the housing shells 130, 170 from being connected. The terminal ribs 186A-186D (e.g., in conjunction with the terminal supports 146A-146D) therefore also serve a position and connection assurance function with respect to the wires 40A-40D and/or wire terminals 146A-146D and the latches 152A-152D, 154A-154D of the first housing shell 130.

As generally illustrated in FIGS. 7B, 8, and 10, the second housing shell 170 includes a cable rib 190. The cable rib 190 is disposed on and projects transversely (e.g., perpendicularly) from the base 172 toward the first housing shell 130. The cable rib 190 extends longitudinally along the base 172 transversely (e.g., perpendicularly) to the axis of the cable opening 114 and/or substantially parallel to the first and fourth sidewalls 174A, 174D. A free end of the cable rib 190 and/or one or more elevations 192A-192D projecting therefrom contact, press against, and/or are disposed in close proximity to the flat cable 20 (e.g., a respective conductor 22A-22D thereof) when the adapter module 110 is in the assembled configuration such that, for example, the flat cable 20 is disposed and/or sandwiched between the free end of the cable rib 190 (e.g., the elevations 192A-192D) and the base 132 of the first housing shell 130. In this way, the cable rib 190 (i) helps to maintain a position of the flat cable 20 in the adapter module 110, (ii) restricts movement of the flat cable 20 relative to the adapter module 110, the housing shells 130, 170, and/or the wire terminals 46 to at least an extent, and (iii) restricts and/or prevents removal of the retention protrusions 142A-142C of the first housing shell 130 from the slots 28A-28C of the flat cable 20.

As generally illustrated in FIGS. 7B, 8, and 10, the second housing shell 170 and/or the cable rib 190 includes a lip 194. The lip 194 is disposed on the cable rib 190 and/or the base 172, and projects transversely (e.g., perpendicularly) from the cable rib 190 toward the first sidewall 174A, and/or the wire apertures 182A-182D (e.g., the wire openings 116A-116D). The lip 194 extends longitudinally along the cable rib 190 and/or the base 172 transversely (e.g., perpendicularly) to the axis of the cable opening 114 and/or substantially parallel to the first and fourth sidewalls 174A, 174D. When the adapter module 110 is in the assembled configuration, the lip 194 contacts, presses against, and/or is disposed in close proximity to the free ends and/or biasing portions 54 of the wire terminals 46 of wires 40A-40D (e.g., in the stacking direction) thereby (i) biasing the contact portions 52 of the wire terminals 46 of wires 40A-40D against the conductors 22A-22D of the flat cable 20, (ii) restricting and/or preventing movement of the wire terminals 46 (e.g., the contact portions 52) of wires 40A-40D away from the conductors 22A-22D, and/or (iii) restricting and/or preventing removal of the nubs 58 of the wire terminals 46 of wires 40A-40D from the terminal recesses 30A-30D of the conductors 22A-22D.

As generally illustrated in FIG. 1, the mount 400 includes a flange 402, a fastener extension 404, and at least one connector (e.g., a male connector $\mathbf{200}_3$). The mount 400 may alternatively include one of the female connectors 300 and/or another connector that is complimentary to the male connector 200 and/or the female connector 300. The flange 402 has a hollow, conical configuration. The male connector $\mathbf{200}_3$ is disposed at and extends from a first, narrower end of the flange 402. The fastener extension 404 is disposed on an opposite side of the flange 402 relative to the male connector $\mathbf{200}_3$ and extends from the flange 402 generally in a direction away from the male connector $\mathbf{200}_3$ (e.g., in the stacking direction). The fastener extension 404 is at least partially encircled by the flange 402 and projects from a second, wider end of the flange 402. The fastener extension 404 is configured to engage a recess disposed in and/or defined by one or more objects and/or structures (e.g., one or more portions of a vehicle, such as a vehicle floor, a panel, a bracket, etc.) to connect the modular adapter assembly 100 to the object and/or structure. The fastener extension 404 includes one or more engagement projections 406 that engage the object and/or structure to connect the mount 400 and/or assembly 100 thereto. The engagement projections 406 have a generally hollow, conical shape and are outwardly angled, sloped, and/or curved toward the flange 402 (e.g., the engagement projections 406 each have a wider end that opens toward the flange 402). The engagement projections 406 are disposed spaced apart from one another along the length of the fastener extension 404. When the mount 400 is connected to the object and/or structure, the second, wider end of the flange 402 presses against the object and/or structure (e.g., a surface thereof facing the flange 402) and biases one or more of the engagement projections 406 of the fastener extension 404 against the object and/or structure. This restricts and/or limits relative movement between the mount 400 (e.g., the assembly 100) and the object and/or structure, which may limit, reduce, and/or prevent noise generation (e.g., rattling).

1. A modular electrical adapter assembly for connecting a plurality of flat cables and a plurality of wires, comprising a plurality of male connectors; a plurality of female connectors complimentary to the plurality of male connectors; and a plurality of adapter modules releasably connected to one another, each adapter module of the plurality of adapter modules including: a first housing shell; a second housing shell releasably connected to the first housing shell; an interior space defined by and between the first housing shell and the second housing shell; a wire opening via which an associated wire of said plurality of wires extends into the interior space; a cable opening via with an associated flat cable of said plurality of flat cables extends into the interior space; a male connector of the plurality of male connectors, the male connector disposed on the second housing shell outside of the interior space; and a female connector of the plurality of female connectors, the female connector disposed on the first housing shell outside of the interior space; wherein adjacent adapter modules of the plurality of adapter modules are releasably connected to one another via engagement of the male connector of a first adapter module of the adjacent adapter modules and the female connector of a second adapter module of the adjacent adapter modules.
2. The modular electrical adapter assembly according to embodiment 1, wherein the plurality of adapter modules are disposed one on top of another in a stacked arrangement.
3. The modular electrical adapter assembly according to any of the preceding embodiments, further comprising a mount via which the plurality of adapter modules are securable to a structure, wherein: the mount includes (i) a fastener engageable with said structure and (ii) a connector; the connector is one of a male connector of the plurality of male connectors and a female connector of the plurality of female connectors; and the mount is releasably connected to an adapter module of the plurality of adapter modules via engagement of the connector of the mount and one of the male connector and the female connector of the adapter module.
4. An electrical adapter for connecting a flat cable and at least one wire, comprising: a first housing shell; a second housing shell releasably connected to the first housing shell; an interior space defined by and between the first housing shell and the second housing shell; a wire opening via which said wire extends into the interior space; a cable opening via with said flat cable extends into the interior space; a male connector disposed on the second housing shell outside of the interior space; and a female connector disposed on the first housing shell outside of the interior space; wherein the male connector and the female connector are releasably engageable with one another such that (i) the second housing shell is releasably connectable to another first housing shell of another electrical adapter and (ii) the first housing shell is releasably connectable to another second housing shell of another electrical adapter.

5. The electrical adapter according to embodiment 4, wherein the first housing shell includes a retention protrusion projecting toward the second housing shell, the retention protrusion disposed in a slot of said flat cable and securing said flat cable to the first housing shell.

6. The electrical adapter according to any of the preceding embodiments, wherein the first housing shell includes at least one latch projecting toward the second housing shell, the at least one latch engaging a wire terminal of said wire and securing said wire to the first housing shell.

7. The electrical adapter according to any of the preceding embodiments, wherein the second housing shell includes a terminal rib projecting toward the first housing shell, the terminal rib engaging the at least one latch and restricting disengagement of the at least one latch and said wire terminal to at least an extent.

8. The electrical adapter according to any of the preceding embodiments, wherein the terminal rib includes a notch in which at least a portion of the at least one latch is disposed.

9. The electrical adapter according to any of the preceding embodiments, wherein the first housing shell includes a terminal support projecting toward the second housing shell and on which a wire terminal of said wire is disposed.

10. The electrical adapter according to any of the preceding embodiments, wherein the first housing shell includes a pair of latches projecting toward the second housing shell and disposed on opposite sides of the terminal support, the pair of latches facing each other and simultaneously engaging said wire terminal and securing said wire terminal on the terminal support.

11. The electrical adapter according to any of the preceding embodiments, wherein the terminal support includes a depression receiving a protuberance of said wire terminal and restricting movement of said wire terminal relative to the terminal support to at least an extent.

12. The electrical adapter according to any of the preceding embodiments, wherein the second housing shell includes a terminal rib projecting toward the first housing shell, the terminal rib having a free end contacting and/or disposed in close proximity to said wire terminal and restricting removal of said protuberance of said wire terminal from the depression of the terminal support.

13. The electrical adapter according to any of the preceding embodiments, wherein the depression opens towards the second housing shell and is at least partially aligned with the terminal rib.

14. The electrical adapter according to any of the preceding embodiments, wherein the terminal rib and the terminal support prevent the first housing shell and the second housing shell from being connected to one another when said wire terminal is improperly seated on the terminal support.

15. The electrical adapter according to any of the preceding embodiments, wherein the second housing shell includes a terminal rib projecting toward the first housing shell, the terminal rib having a free end contacting and/or disposed in close proximity to a wire terminal of said wire and restricting movement of said wire terminal relative to the first housing shell to at least an extent.

16. The electrical adapter according to any of the preceding embodiments, wherein the second housing shell includes a cable rib projecting toward the first housing shell, the cable rib having a free end contacting and/or disposed in close proximity to said flat cable and restricting movement of said flat cable relative to the first housing shell to at least an extent.

17. The electrical adapter according to any of the preceding embodiments, wherein the second housing shell includes a lip projecting toward the wire opening, the lip contacting and/or disposed in close proximity to a free end of a wire terminal of said wire and restricting movement of said wire terminal away from a conductor of said flat cable engaged therewith.

18. The electrical adapter according to any of the preceding embodiments, wherein: the female connector includes (i) a pair of tracks and (ii) a tab; and the male connector includes (i) a pair of guide rails slidably engageable with the pair of tracks and (ii) a latch releasably engageable with the tab.

19. An electrical adapter for connecting a flat cable and a wire, comprising: a first housing shell; a second housing shell releasably connected to the first housing shell; an interior space defined by and between the first housing shell and the second housing shell; a wire opening via which said wire extends into the interior space; a cable opening via with said flat cable extends into the interior space; a male connector disposed on the second housing shell outside of the interior space; and a female connector disposed on the first housing shell outside of the interior space; wherein the first housing shell includes: a retention protrusion projecting toward the second housing shell, the retention protrusion disposed in a slot of said flat cable and securing said flat cable to the first housing shell; a terminal support projecting toward the second housing shell and on which a wire terminal of said wire is disposed; and at least one latch disposed adjacent to the terminal support and projecting toward the second housing shell, the at least one latch engaging said wire terminal and securing said wire terminal on the terminal support; wherein the second housing shell includes: a terminal rib projecting toward the first housing shell, the terminal rib having a free end contacting and/or disposed in close proximity to said wire terminal and restricting disengagement of the at least one latch and said wire terminal to at least an extent; a cable rib projecting toward the first housing shell, the cable rib having a free end contacting and/or disposed in close proximity to said flat cable and restricting removal of the retention protrusion from said slot of said flat cable; and a lip projecting from the cable rib toward the terminal rib, the lip contacting and/or disposed in close proximity to a free end of said wire terminal and restricting movement of said wire terminal away from a conductor of said flat cable engaged therewith; and wherein the male connector and the female connector are releasably engageable with one another such that (i) the second housing shell is releasably connectable to another first housing shell of another electrical adapter and (ii) the first housing shell is releasably connectable to another second housing shell of another electrical adapter.

20. A modular adapter assembly for connecting a plurality of flat cables and a plurality of wires, comprising a plurality of electrical adapters according to any of the preceding embodiments, wherein adjacent adapters of the plurality of adapters are releasably connected to one another via engagement of the male connector of a first adapter of the adjacent adapters and the female connector of a second adapter of the adjacent adapters.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A modular electrical adapter assembly for connecting a plurality of flat cables and a plurality of wires, comprising:

a plurality of male connectors;

a plurality of female connectors complimentary to the plurality of male connectors; and a plurality of adapter modules releasably connected to one another, each adapter module of the plurality of adapter modules including:

a first housing shell;

a second housing shell releasably connected to the first housing shell;

an interior space defined by and between the first housing shell and the second housing shell;

a wire opening via which an associated wire of said plurality of wires extends into the interior space;

a cable opening via with an associated flat cable of said plurality of flat cables extends into the interior space;

a male connector of the plurality of male connectors, the male connector disposed on the second housing shell outside of the interior space; and a female connector of the plurality of female connectors, the female connector disposed on the first housing shell outside of the interior space;

wherein adjacent adapter modules of the plurality of adapter modules are releasably connected to one another via engagement of the male connector of a first adapter module of the adjacent adapter modules and the female connector of a second adapter module of the adjacent adapter modules.

2. The modular electrical adapter assembly of claim 1, wherein the plurality of adapter modules are disposed one on top of another in a stacked arrangement.

3. The modular electrical adapter assembly of claim 1, further comprising a mount via which the plurality of adapter modules are securable to a structure, wherein:

the mount includes (i) a fastener engageable with said structure and (ii) a connector;

the connector is one of the male connector of the plurality of male connectors and the female connector of the plurality of female connectors; and the mount is releasably connected to the adapter module of the plurality of adapter modules via engagement of the connector of the mount and one of the male connector and the female connector of the adapter module.

4. An electrical adapter for connecting a flat cable and at least one wire, comprising:

a first housing shell;

a second housing shell releasably connected to the first housing shell;

an interior space defined by and between the first housing shell and the second housing shell;

a wire opening via which said wire extends into the interior space;

a cable opening via with said flat cable extends into the interior space;

a male connector disposed on the second housing shell outside of the interior space; and a female connector disposed on the first housing shell outside of the interior space;

wherein the male connector and the female connector are releasably engageable with one another such that (i) the second housing shell is releasably connectable to another first housing shell of another electrical adapter and (ii) the first housing shell is releasably connectable to another second housing shell of another electrical adapter.

5. The electrical adapter of claim 4, wherein the first housing shell includes a retention protrusion projecting toward the second housing shell, the retention protrusion disposed in a slot of said flat cable and securing said flat cable to the first housing shell.

6. The electrical adapter of claim 4, wherein the first housing shell includes at least one latch projecting toward the second housing shell, the at least one latch engaging a wire terminal of said wire and securing said wire to the first housing shell.

7. The electrical adapter of claim 6, wherein the second housing shell includes a terminal rib projecting toward the first housing shell, the terminal rib engaging the at least one latch and restricting disengagement of the at least one latch and said wire terminal to at least an extent.

8. The electrical adapter of claim 7, wherein the terminal rib includes a notch in which at least a portion of the at least one latch is disposed.

9. The electrical adapter of claim 4, wherein the first housing shell includes a terminal support projecting toward the second housing shell and on which a wire terminal of said wire is disposed.

10. The electrical adapter of claim 9, wherein the first housing shell includes a pair of latches projecting toward the second housing shell and disposed on opposite sides of the terminal support, the pair of latches facing each other and simultaneously engaging said wire terminal and securing said wire terminal on the terminal support.

11. The electrical adapter of claim 9, wherein the terminal support includes a depression receiving a protuberance of said wire terminal and restricting movement of said wire terminal relative to the terminal support to at least an extent.

12. The electrical adapter of claim 11, wherein the second housing shell includes a terminal rib projecting toward the first housing shell, the terminal rib having a free end contacting and/or disposed in close proximity to said wire terminal and restricting removal of said protuberance of said wire terminal from the depression of the terminal support.

13. The electrical adapter of claim 12, wherein the depression opens towards the second housing shell and is at least partially aligned with the terminal rib.

14. The electrical adapter of claim 12, wherein the terminal rib and the terminal support prevent the first housing shell and the second housing shell from being connected to one another when said wire terminal is improperly seated on the terminal support.

15. The electrical adapter of claim 4, wherein the second housing shell includes a terminal rib projecting toward the first housing shell, the terminal rib having a free end contacting and/or disposed in close proximity to a wire terminal of said wire and restricting movement of said wire terminal relative to the first housing shell to at least an extent.

16. The electrical adapter of claim 4, wherein the second housing shell includes a cable rib projecting toward the first housing shell, the cable rib having a free end contacting and/or disposed in close proximity to said flat cable and restricting movement of said flat cable relative to the first housing shell to at least an extent.

17. The electrical adapter of claim 4, wherein the second housing shell includes a lip projecting toward the wire opening, the lip contacting and/or disposed in close proximity to a free end of a wire terminal of said wire and restricting movement of said wire terminal away from a conductor of said flat cable engaged therewith.

18. The electrical adapter of claim 4, wherein:

the female connector includes (i) a pair of tracks and (ii) a tab; and the male connector includes (i) a pair of guide rails slidably engageable with the pair of tracks and (ii) a latch releasably engageable with the tab.

19. An electrical adapter for connecting a flat cable and a wire, comprising:

a first housing shell;

a second housing shell releasably connected to the first housing shell;

an interior space defined by and between the first housing shell and the second housing shell;

a wire opening via which said wire extends into the interior space;

a cable opening via with said flat cable extends into the interior space;

a male connector disposed on the second housing shell outside of the interior space; and a female connector disposed on the first housing shell outside of the interior space;

wherein the first housing shell includes:

a retention protrusion projecting toward the second housing shell, the retention protrusion disposed in a slot of said flat cable and securing said flat cable to the first housing shell;

a terminal support projecting toward the second housing shell and on which a wire terminal of said wire is disposed; and at least one latch disposed adjacent to the terminal support and projecting toward the second housing shell, the at least one latch engaging said wire terminal and securing said wire terminal on the terminal support;

wherein the second housing shell includes:

a terminal rib projecting toward the first housing shell, the terminal rib having a free end contacting and/or disposed in close proximity to said wire terminal and restricting disengagement of the at least one latch and said wire terminal to at least an extent;

a cable rib projecting toward the first housing shell, the cable rib having a free end contacting and/or disposed in close proximity to said flat cable and restricting removal of the retention protrusion from said slot of said flat cable; and a lip projecting from the cable rib toward the terminal rib, the lip contacting and/or disposed in close proximity to a free end of said wire terminal and restricting movement of said wire terminal away from a conductor of said flat cable engaged therewith; and wherein the male connector and the female connector are releasably engageable with one another such that (i) the second housing shell is releasably connectable to another first housing shell of another electrical adapter and (ii) the first housing shell is releasably connectable to another second housing shell of another electrical adapter.

20. A modular adapter assembly for connecting a plurality of flat cables and a plurality of wires, comprising a plurality of electrical adapters according to claim 19, wherein adjacent adapters of the plurality of adapters are releasably connected to one another via engagement of the male connector of a first adapter of the adjacent adapters and the female connector of a second adapter of the adjacent adapters.

* * * * *